July 13, 1965  R. L. COMET  3,194,096
MACHINE FOR CUTTING SHEET MATERIALS
Filed Sept. 28, 1962  4 Sheets-Sheet 1
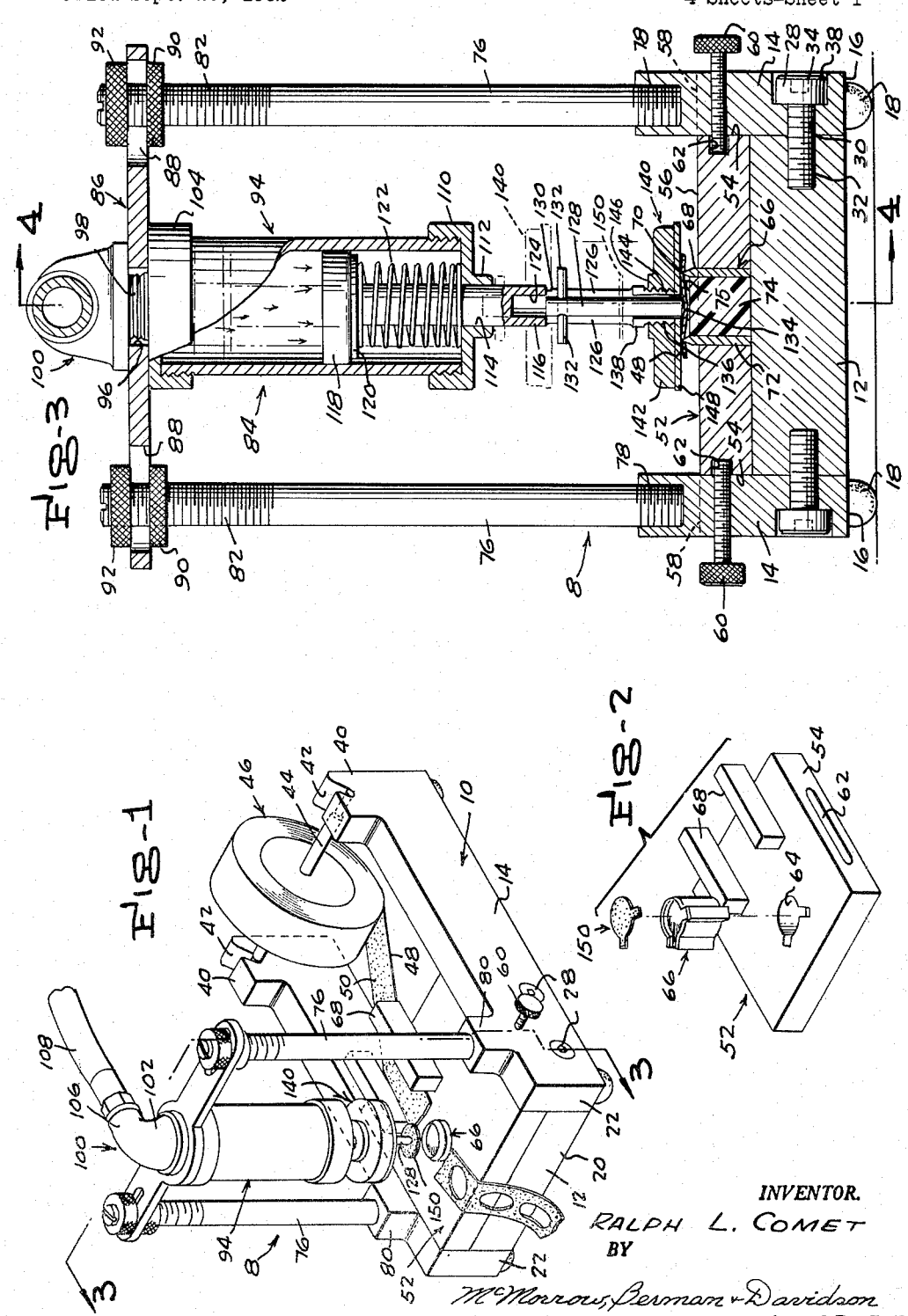
INVENTOR.
RALPH L. COMET
BY
McMorrow, Berman & Davidson
ATTORNEYS

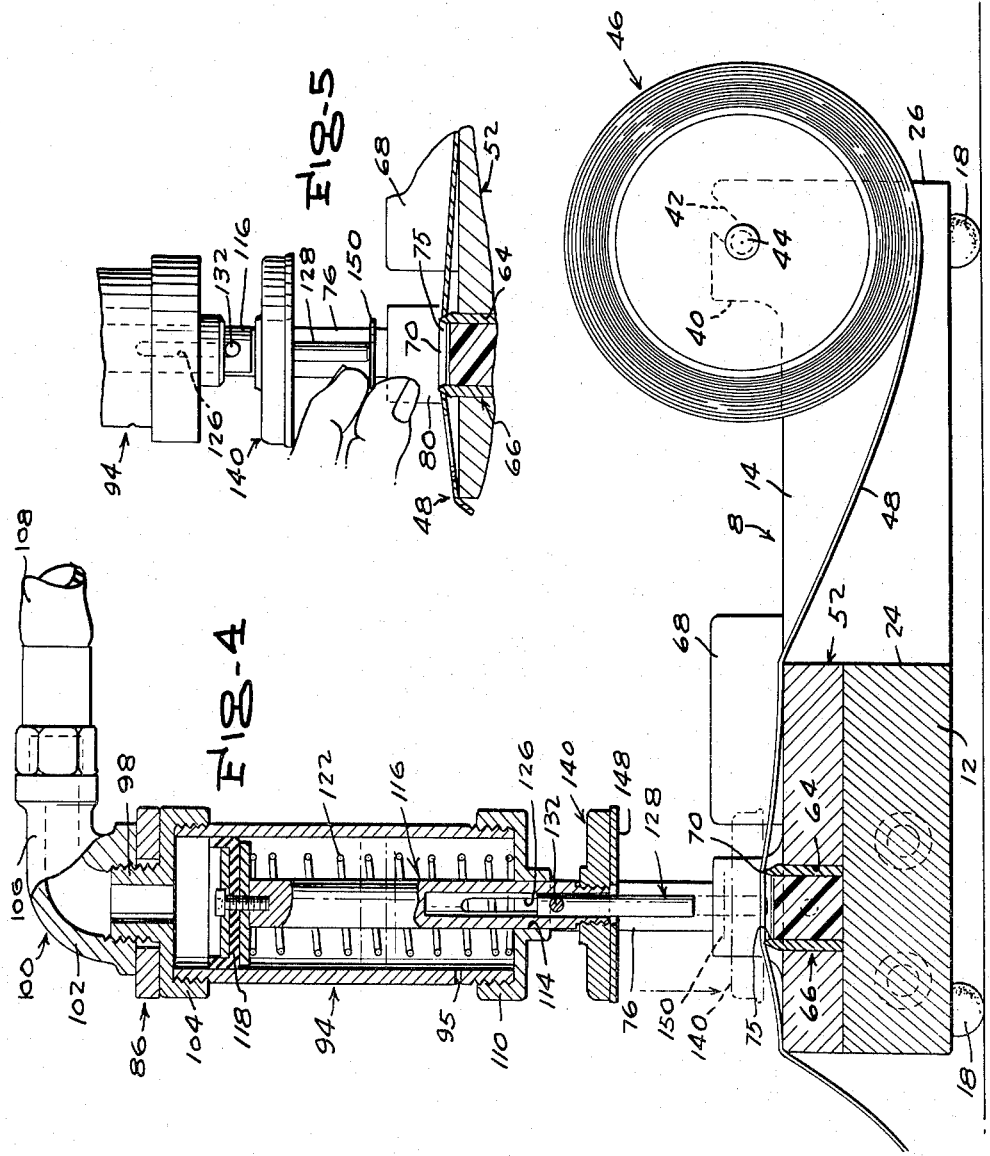

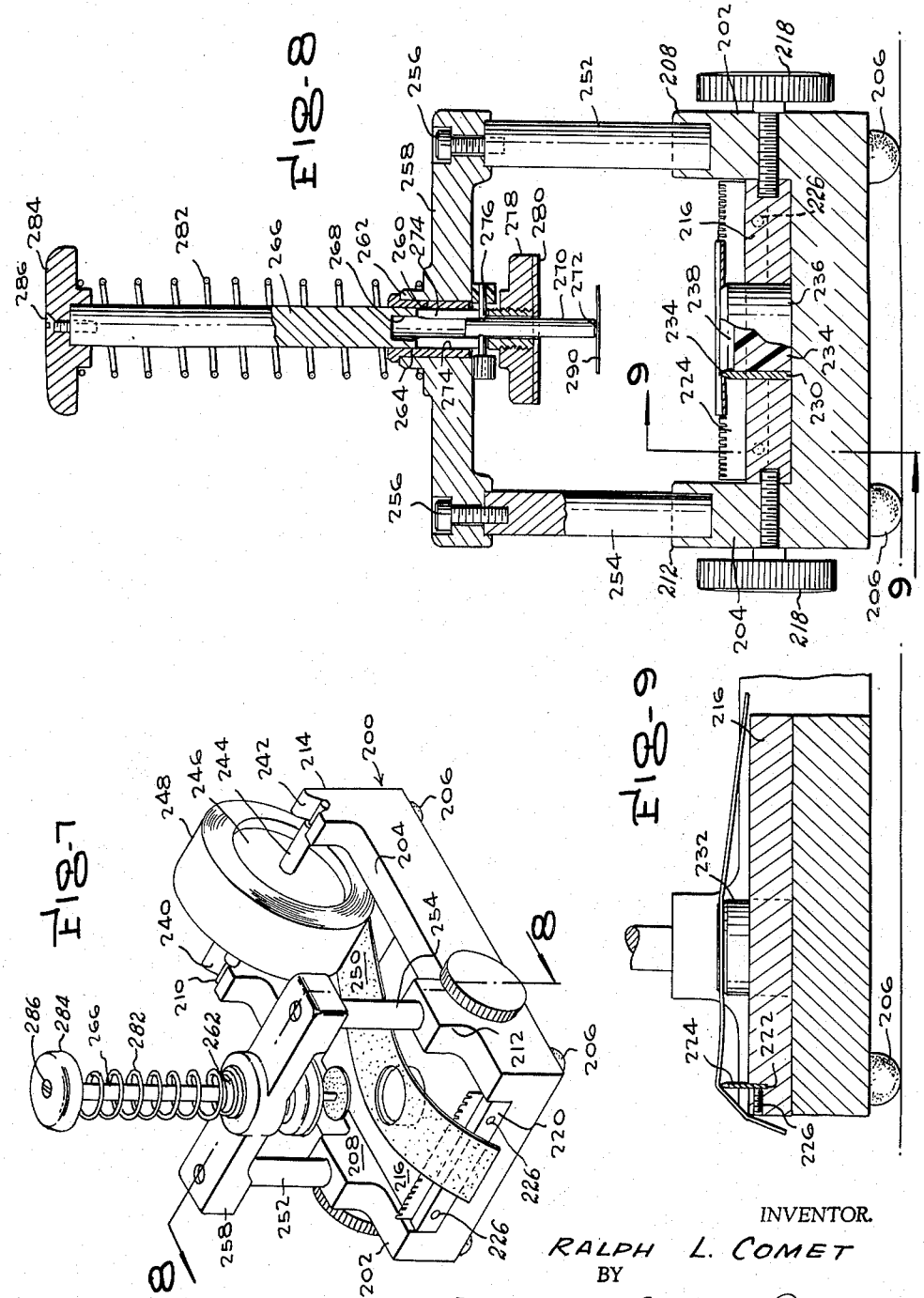

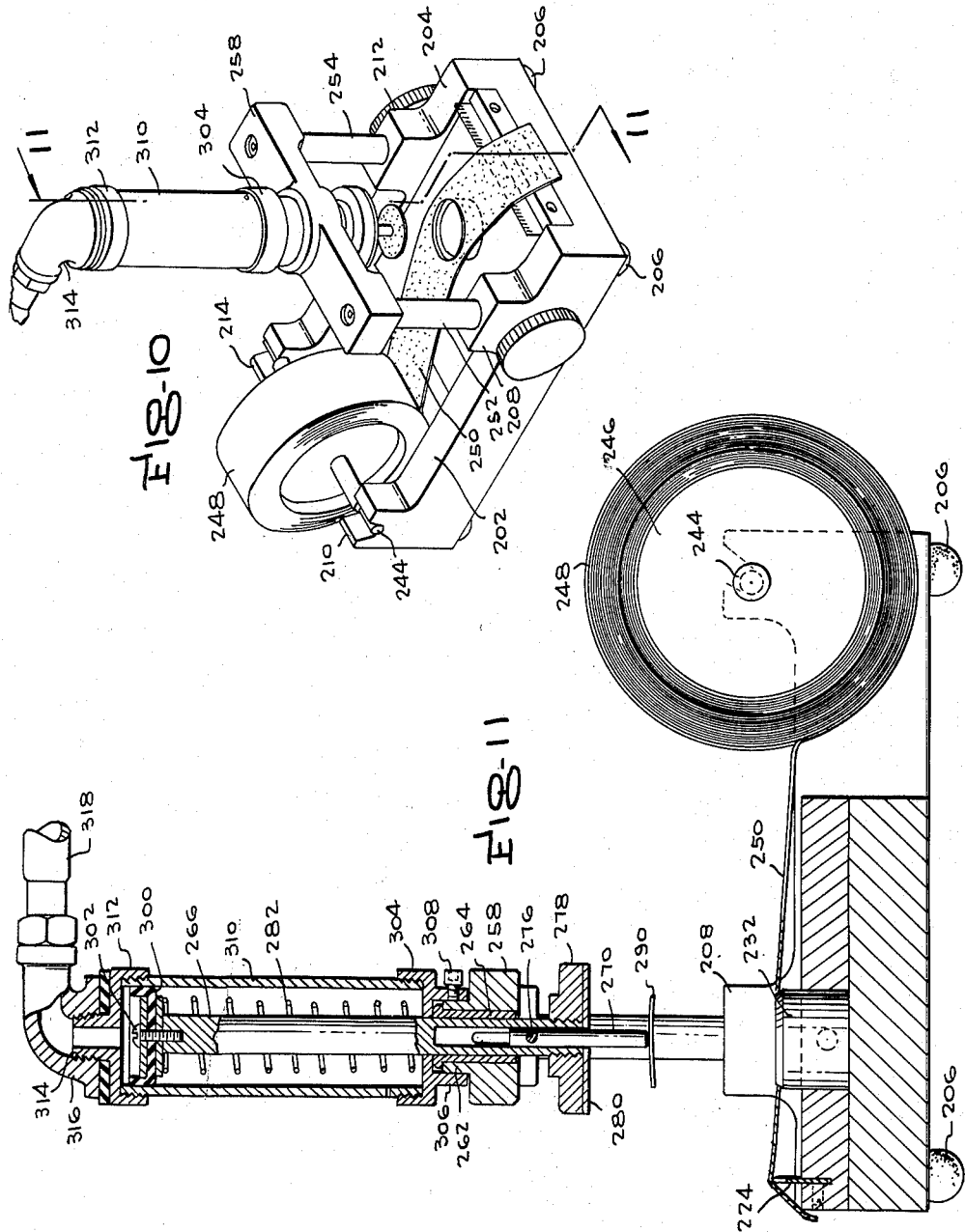

United States Patent Office 3,194,096
Patented July 13, 1965

3,194,096
MACHINE FOR CUTTING SHEET MATERIALS
Ralph L. Comet, Nutley, N.J., assignor to Mask-O-Matic, Inc., Paterson, N.J., a corporation of New Jersey
Filed Sept. 28, 1962, Ser. No. 227,647
1 Claim. (Cl. 83—103)

This invention relates to a novel machine for cutting sheet materials and comprises a continuation-in-part of my co-pending application Serial No. 153,048, filed November 17, 1961, now abandoned, and entitled Machine for Cutting Sheet Materials.

More particularly, this invention relates to new and novel machines for cutting protective masks of different shapes and sizes from adhesive or other types of self-sticking masking tape.

One of the primary objects of this invention is the provision of simpler, less costly, more efficient, and more easily operable machines of the kind indicated that may be manually or pneumatically operated, and which are suitable for individual use and operation by factory workers engaged in applying individual masks to articles for their repair, processing, handling, storage, or shipment, and the like.

Another object of the invention is the provision of a machine of the character indicated above which comprises a base above which is mounted a punch assembly including a piston rod carrying a fixed anvil, the latter being opposed to a hollow cutting die mounted on a die block, and a mask-dispensing member mounted on the punch assembly for limited free movement relative thereto, the member being essentially designed to contact the adhesive face of a masking disc or element as the same is cut to lift the same away from the die as the anvil is retracted away therefrom.

A further object of the invention is the provision of a machine of the character indicated above, wherein the die block is adjustable crosswise relative to the base, in one direction, and the punch assembly is adjustable both vertically relative to the base and die block, and crosswise of the base, at right angles to the said one direction, for exactly aligning the anvil and cutting die, and for adjusting the punch assembly toward and away from the die block.

Another object of this invention is to provide a machine of the type referred to supra, wherein the machine may be readily converted from manually-operable means to pneumatically-operable means, and vice versa.

A still further object of this invention is to provide in a device of the type described, removable tape-severing means whereby the exploited portions of the tape may be removed from the main unused body thereof.

This invention contemplates, as still a further object thereof, the provision of a machine of the general type to which reference has been made, the machine being non-complex in construction and assembly, inexpensive to manufacture, and which is durable in use.

Other and further objects and advantages of the instant invention will become more evident from a consideration of the following specification when read in conjunction with the annexed drawings, in which:

FIGURE 1 is a front perspective view of a machine constructed in accordance with the present invention, this figure showing a roll of adhesive masking tape in place thereon and guided across a die block, the anvil and dispensing member being shown in retracted position with a cut mask adhered thereto;

FIGURE 2 is an exploded perspective view of the die block, showing a die removed from the seat, and a cut mask;

FIGURE 3 is an enlarged vertical, transverse section taken on the line 3—3 of FIGURE 1, showing the arbor and the dispensing member, with a mask adhering thereto, in phantom elevated positions, and in depressed positions in full lines;

FIGURE 4 is a vertical, longitudinal section taken on the line 4—4 of FIGURE 3;

FIGURE 5 is a fragmentary side elevation, parts being in section, showing manual removal of a cut mask from the dispensing member when in its elevated position;

FIGURE 6 is a group plan view showing non-limiting forms of masks produceable by the machine;

FIGURE 7 is a perspective view of a second embodiment of this invention;

FIGURE 8 is an enlarged detail cross-sectional view of the machine shown in FIGURE 7, FIGURE 8 being taken on the vertical plane of line 8—8 of FIGURE 7, looking in the direction of the arrows;

FIGURE 9 is a fragmentary, detail cross-sectional view taken substantially on the vertical plane of line 9—9 of FIGURE 8, looking in the direction of the arrows;

FIGURE 10 is a perspective view of a further modification of this invention; and FIGURE 11 is an enlarged, detail cross-sectional view, FIGURE 11 being taken substantially on the vertical plane of line 11—11 of FIGURE 10, looking in the direction of the arrows.

Referring now more specifically to the drawings, the illustrated machine comprises a frame 8 having a normally horizontal base 10 which may be disposed in other positions, and including an abbreviated bottom wall 12 and side walls 14 which are substantially longer than the bottom wall 12. The side walls 14 extend above the bottom wall 12 and have lower edges 16 flush with the underside of the bottom wall and provided, adjacent their ends, with support-engaging feet, such as resilient knobs 18. The forward end 20 of the bottom wall 12 is preferably flush with the forward ends 22 of the side walls 14, the rear end 24 of the bottom wall being spaced from the rear ends 26 of the side walls, the bottom wall 12 being secured in place, as by means of machine screws 28, threaded through bores 30 and 32 in the side walls 14 and the bottom wall, respectively, with the heads 34 of the screws seated in counterbores 38 in the outer sides of the side walls. This arrangement provides for easy substitution of bottom walls 12 of different widths, where desired, for accommodating die blocks of different widths, and cooperates with the substitution of different width mountings of the pneumatic cylinder assembly hereinafter described.

Adjacent to the rear ends 26 of the side walls 14, the latter have transversely-aligned upstanding legs 40 having forwardly and downwardly-declining, tapered slots 42 in their upper ends, in which are engaged the ends of the shaft 44 of a reel 46 carrying adhesive tape 48, which is fed, forwardly, from the underside of the reel, with its adhesive surface 50 facing upwardly.

The tape 48 is fed forwardly across a flat rectangular die block 52, which rests upon the bottom wall 12 and has side edges 54 which bear slidably against the inner surfaces of the side walls 14, the block 52 being preferably of the same length as the bottom wall 12 and having an upper surface 56 flush with the upper edges 58 of the base side walls 14. The die block 52 is adjustably secured in place, for endwise or longitudinal adjustments along the bottom wall 12, as by means of thumbscrews 60, threaded through the side walls 14 and engaged in longitudinal grooves 62, formed in the side edges 54 of the block.

The die block 52 is formed with a central die seat 64, of a horizontal shape and cross-section corresponding to that of a cutting die 66 used, the seat 64 extending through the block 52, as shown in FIGURES 3 and 4. Upstanding longitudinal guide blocks 68 on the die block 52 and reaching beyond the rear end of the die block, are spaced from each other at the width of the tape 48, and guide the tape 48 accurately across the die 66, the tape being manually or otherwise fed to the die.

The die 66 has exposed above the upper surface of the die block 52, a tubular upper portion 68 which terminates in a sharpened cutting edge 70. The die is preferably composed of a tubular metal body 72, of which the upper portion 68 is a part, and a body 74 of suitable fill material fills the interior of the tubular body 72, from its lower end which rests upon the bottom wall 12 of the base 10, to a level below the cutting edge 70, whereby a socket 75, slightly deeper than the thickness of the tape 48, is provided in the upper end of the die 66.

The frame 8 further comprises a pair of transversely-aligned standards 76 which are transversely-aligned with the die 66, and which are preferably threaded, at their lower ends, as indicated at 78, in upstanding bosses 80 on the base side walls 14, and provided with threaded upper ends 82. The standards 76 support between them an adjustable pneumatic punch assembly 84.

The punch assembly 84 comprises a crossbar 86 having longitudinal adjustment slots 88, at its ends, which receive the upper ends of the standards 76, with the bar 86 resting upon lower knurled nuts 90, threaded on the upper ends 82 of the standards, and held down in place by upper knurled nuts 92 threaded on the standards. This arrangement enables adjusting the crossbar 86 endwise for centering the pneumatic cylinder 94 of the assembly, relative to the die 66. This arrangement also provides for the substitution of longer or shorter crossbars 86, where different width die blocks 52 are used, as hereinabove mentioned.

The crossbar 86 is provided with a smooth central opening 96 through which extends an upstanding axial tubular, reduced-diameter, externally-threaded neck 98, on the upper end of the pneumatic cylinder 94. An elbow pipe fitting 100 has a flared arm 102 which is threaded on the neck 98, has communication therewith, and bears upon the upper surface of the crossbar 86, so as to clamp the cap 104, on the upper end of the cylinder 94, against the underside of the crossbar. The elbow fitting 100 has a rearwardly-extending horizontal arm 106, to which an air pressure hose 108 is connected, the hose 108 leading to a suitably valved source (not shown) of air pressure.

The pneumatic cylinder 94 has a cap 110, on its lower end, having a central pendant boss 112, sharing an axial vertical bore 114 with the cap. A plunger or piston rod 116 works through the bore 114 and has, working in the cylinder 94, a flat piston 118 fixed on its upper end, having a washer 120 on its underside. The side wall of the cylinder has an air vent 95 below the piston 118. A retracting coil spring 122 is spacedly circumposed on the plunger 118 and is compressed between the washer 120 and the lower cylinder cap 110, whereby, after the release of air pressure in the cylinder 94, above the piston 118, the piston and the plunger 118 are automatically retracted upwardly away from the die 66, with which the plunger 118 is axially aligned.

As shown in FIGURES 3 and 4, the plunger 118 is formed with a vertically-elongated socket 124, having a closed upper end, which opens to the lower end of the plunger. Vertically-elongated, diametrically-opposed slots 126 are formed in the side wall of the socket 124. A dispensing rod 128, longer than the distance between the lower end of the plunger 118 and the upper ends 130 of the slots 126, is slidably engaged in the socket 124 and has, adjacent to its upper end, diametrically-opposed radial pins 132 which work in the slots 126, and limit upward-and-downward movements of the dispensing rod 128, relative to the plunnger 118. The rod 128 has a preferably rounded lower end 134.

The plunger 118 terminates, at its lower end, in a threaded tip 136 having an annular stop shoulder 138, at its upper end, on which is threaded a removable arbor 140. The arbor 140 comprises a preferably solid flat circular disc 142, substantially larger in diameter than the die 66 and concentric therewith. The arbor 140 is provided with an axial bore 144 in which the plunger tip 136 is threaded, with its shoulder 138 engageable with an upstanding central boss 146 on the arbor. The arbor has suitably fixed to its underside a hardened metal disc 148 forming an anvil.

In operation, the tape 48 having been placed over the die 66, compressed air is fed to the cylinder so as to force the arbor 140 and its anvil 148 downwardly against the tape, so that the cutting edge 70 of the die cuts through the tape and forms a mask 150. As the arbor 140 and its anvil 148 descends toward the tape, the lower end 134 of the dispensing rod 128 engages the as yet uncut mask 150, in advance of engagement of the anvil 148 with the tape. The compressed air source is then operated to relieve the air pressure above the piston 118 in the cylinder 94, so that the spring 122 expands and retracts the arbor 140 and its anvil 148 upwardly away from the die 66. As this takes place, the dispensing rod 128, with the cut mask 150, adhered to its lower end 134, falls out of the bore socket 124 of the plunger 118, until its pins 132 engage the lower ends of the slots 126, so that, as shown in FIGURE 5, the cut mask 150 is suspended above the die, in a position to be easily manually-removed from the dispensing rod and applied to the workpiece (not shown). Operation of the machine is easy and rapid, so that the operator thereof is enabled to cut and apply masks 150 with accuracy and speed limited only by the skill and coordination of the operator.

As shown in FIGURES 2 and 6, the die 66 can be shaped to produce, in the manner described above, different shapes of masks 150, simply by changing die blocks 52 and dies 66, which is easily done merely by backing out the thumbscrews 60 from the die block slots 62, removing a die block 52 and replacing it with the desired die block. Vertical adjustment of the punch assembly 84, relative to the die 66, is done simply by running the lower knurled nuts 90 upwardly or downwardly on the upper ends of the standards 76, and then turning the upper knurled nuts 92 down onto the crossbar 86.

FIGURES 7 to 9, inclusive, illustrate another embodiment of this invention wherein reference numeral 200 denotes a substantially rectangular base normally disposed in a horizontal position and having a pair of upright laterally-spaced, parallel and longitudinally-extending side walls 202, 204 projecting upwardly therefrom. The four corners of the base may be provided with resilient support-engaging knobs 206, as hereinbefore described.

The side walls 202, 204 each includes longitudinally-spaced and upstanding bosses 208, 210 and 212, 214, respectively, corresponding to previously-described elements.

Disposed on the base 200 and between the side walls 202, 204, is a substantially rectangular die block 216, releasably secured thereon by opposed manually-operable screws 218 threaded through the side walls 202, 204.

The die block 216 adjacent its forward end 220 is provided with a transversely-extending groove 222 in which is inserted an upwardly-projecting serrated knife blade 224 secured therein by Allen screws 226. The knife edge of the blade 224 is disposed above the plane of the upper side of the die block 216. The die block 216, as before, is formed with a transversely-extending die seat 230 to receive therein a cutting die 232, referred to above as bearing reference numeral 66, and the configuration of the cutting die may be such as to give rise to any one of the masks 150 or analogous configurations.

The cutting die 232 has an upper end projecting above the upper surface of the die block 216, the upper end being sharpened to form a cutting edge 234. As in the preceding embodiment, a filter material 236 is inserted within the cutting die 232, the filler material extending upwardly from the upper side of the die block 216 to a point adjacent to, but spaced below the cutting edge 234.

The bosses 210, 214 are formed with downwardly-extending upwardly opening V-shaped notches 240, 242 which loosely receive therein the opposed ends of the shaft 244 on which is fixedly secured a spool 246 bearing a tape 248 having an adhesively-coated, upwardly-facing surface 250. As before, the tape is withdrawn for extension over the die 232 and across the blade 224.

Threaded or press-fitted into the bosses 208, 212 are the lower ends of a pair of upright, substantially cylindrical standards 252, 254. Extending transversely across the die block 216 and fixedly secured to the upper ends of the standards 252, 254 by screws 256 are the opposed ends of a substantially rectangular crossbar 258. The crossbar 258 is formed with a centrally-located smooth bore 260 having, at the upper end thereof, an annular upwardly-projecting collar 262. Pressed or otherwise fitted within the bore 260 is a smooth sleeve 264. Mounted for reciprocation through the sleeve 264 is an elongated, substantially cylindrical plunger shaft 266, the lower end of which is inwardly bored as at 268, to slidably receive therein a plunger rod 270 having a rounded lower end 272. The shaft 266 adjacent the lower end thereof is provided with a pair of diametrically-opposed, axially-extending slots 274 which receive, for reciprocation therein, the opposed ends of a diametrically-extending pin 276 which projects diametrically through the upper end of the plunger rod 270. Threaded on the lower end of the shaft 266 is an arbor 278 having secured thereto or formed integrally with the underside thereof, a hardened metal cutter disc 280 comprising an anvil.

A helicoidal spring 282, under tension, surrounds the upper end of the shaft 266 and the collar 262, with its lower end abutting against the crossbar 258. The upper end of the spring 282 engages against the underside of the substantially discoidal handle 284 secured to the shaft 266 by a centrally-located screw 286. The construction is such that the shaft 266 is constantly biased for movement in a direction away from the die block 220.

In operation, and assuming that the device has been assembled in the manner described above, it will be understood that a length of tape has been stripped from the roll or spool 248 and extended across the upper cutting edge 234 of the cutter die 232, and has a portion thereof extending across and beyond the blade 224, the operator now strikes the discoidal handle 284 with his hand or fist, forcing the shaft 266 downwardly toward the cutting die 232. The movement of the shaft in this direction is made, of course, against the tension of the spring 282. As the shaft descends, the lower end 272 of the plunger rod 270 will engage against the adhesively-coated side of the tape extending across the cutter die and the rod 270 will remain substantially stationary as the shaft 266, its connected arbor 278 and cutter disc or anvil 280 continue to move downwardly toward the cutter die 232. Under these conditions, the cross-pin 276 will move upwardly relative to the slots 274.

Continued exertion of force on the discoidal handle 284 suffices to cause the cutter disc or anvil 280 to penetrate and sever the tape 248 on the cutter die 232, and as this force is released, the helicoidal spring 282 forces the handle 284 and the shaft 266 to move upwardly, or in the reverse direction. This, of course, moves the arbor 278 and its connected cutter disc or anvil 280 away from the cutting edge 234 of the cutter die 232, while the lower end 272 of the plunger rod 270 remains in contact with a cut mask 290. As the arbor 278 with its cutter disc 280 returns to its normal raised position, the pin 276 is engaged within the lower ends of the slots 274 to raise the plunger rod 270 and the attached cut-out mask 290. The operator now removes the disc 290 from the plunger rod 270 and moves the tape 248 to unwind a further length thereof for extension across the cutter die 232, after which the punching or cutting operation described immediately above is repeated.

The blade 224 is utilized to cut the tape 248 beyond the punched or cut portion thereof and provides the operator with a portion of tape easily grasped by the fingers to effect sequential dispensing of the tape 248 as the machine is operated.

FIGURES 10 and 11 illustrate a still further embodiment of this invention, but preserve, at the same time, the advantages of the invention disclosed in FIGURES 7 to 9, inclusive. While the embodiment of this invention shown in FIGURES 7 to 9, inclusive, contemplates manual operation of the device, FIGURES 10 and 11 illustrate a simple conversion of the same to pneumatic operation.

Insofar as elements common to the embodiment of the invention shown in FIGURES 7 to 9, inclusive, and FIGURES 10 and 11, the same reference numerals have been applied.

In FIGURES 10 and 11 it will be seen that the discoidal handle 284 has been removed and substituted in lieu thereof is a substantially cylindrical gasket 300. The gasket 300 is secured in place on the upper end of the shaft 266 by means of the screw 302.

In this instance, the shaft 266 extends through a substantially cylindrical collar 304 having a substantially cylindrical skirt or flange 306 which surrounds the collar 262 and abuts against the crossbar 258 at its lower end. The collar 304 is fixedly secured to the collar 262 as by the set screw 308. Threaded into the collar 304 is the lower end of an elongated, substantially hollow, cylindrical member 310 which terminates, at its upper end, in a second threaded collar 312. The collar 312 is formed with a centrally-located, upwardly-projecting nozzle 314 which, at its open end, is in communication with the cylindrical member 310. An elbow connector 316 is threaded on the nozzle 314, and the connector is, in turn, connected through a conduit 318 with a valve-controlled source of air under pressure (not shown).

The operation of the device of FIGURES 10 and 11 is similar to that of the embodiment of this invention illustrated in FIGURES 7 to 9, inclusive, except that in the last embodiment, sequential jets of air are passed to the gasket 300 to force the shaft 266 downwardly to accomplish the cutting and severing action. Release of the air pressure on the gasket 300 permits the helicoidal spring 282, which surrounds the shaft 266 and abuts against the gasket 300 at its upper end and against the cylindrical collar 304 at its lower end, to return to its normal upper-extended position, as shown in FIGURE 11.

Since the valve-controlled intermittent air supply is old and well-known in the art, it is not believed necessary that the same be shown in association with the structure of the instant invention.

Having described and illustrated herein several embodiments of this invention, it will be understood that the same are offered merely by way of example, and that the scope of this invention is to be limited only by the appended claim.

What is claimed is:

A machine of the character described, said machine comprising a support carrying a fixed die, a punch assembly mounted on said support, said punch assembly including a plunger shaft mounted for reciprocation toward and away from said die and being aligned therewith, means operable to effect said reciprocation, an anvil mounted on that end of said plunger shaft proximate said die and aligned therewith, a plunger rod mounted for reciprocation in said end of said plunger shaft and having limited movement relative thereto, said plunger rod having an end normally extending transversely through said anvil toward said die for contact with an object to be punched from a strip of material disposed between said die and said anvil as said anvil is moved to effect contact with said material and subsequent severance of said object, and means on said plunger rod cooperating with means on said plunger shaft to move said plunger rod together with said object away from said strip of material subsequent to movement of said anvil out of contact with said strip.

References Cited by the Examiner
UNITED STATES PATENTS

| | | | |
|---|---|---|---|
| 1,711,561 | 5/29 | Evans et al. | 225—94 X |
| 1,939,478 | 12/33 | Whistler | 83—685 |
| 1,986,611 | 1/35 | Thomsen | 83—136 |
| 2,354,860 | 8/44 | Harstock et al. | 83—129 |
| 2,363,407 | 11/44 | Foster | 83—126 X |
| 2,463,514 | 3/49 | Bucky | 225—7 |
| 2,475,807 | 7/49 | Smith | 83—141 |
| 2,479,028 | 8/49 | Stoneham | 83—588 |
| 2,540,697 | 2/51 | Staples | 225—7 X |
| 2,595,305 | 5/52 | Scott | 83—116 X |
| 2,674,311 | 4/54 | Griswold | 83—126 X |
| 2,725,100 | 11/55 | Payne | 83—126 |
| 3,045,518 | 7/62 | Kjelgaard | 83—146 |
| 3,089,375 | 5/63 | Williamson | 83—639 X |
| 3,091,147 | 5/63 | Holl et al. | 83—700 X |

FOREIGN PATENTS 13,005 10/86 Great Britain.

ANDREW R. JUHASZ, *Primary Examiner.*
WILLIAM W. DYER, JR., *Examiner.*